W. SAVAGE.
GARBAGE INCINERATOR.
APPLICATION FILED APR. 25, 1919. RENEWED JULY 2, 1920.

1,349,785.

Patented Aug. 17, 1920.

Inventor
William Savage
By
Attorney

UNITED STATES PATENT OFFICE.

WILLIAM SAVAGE, OF THREE RIVERS, QUEBEC, CANADA.

GARBAGE-INCINERATOR.

1,349,785. Specification of Letters Patent. Patented Aug. 17, 1920.

Application filed April 25, 1919, Serial No. 292,679. Renewed July 2, 1920. Serial No. 393,566.

*To all whom it may concern:*

Be it known that I, WILLIAM SAVAGE, residing at Three Rivers, in Province of Quebec, in the Dominion of Canada, have invented certain new and useful Improvements in Garbage-Incinerators; and I do hereby declare that the following is a full, clear, and exact description of the same.

The present invention relates to garbage incinerators and the object of the invention is to provide a device of this character in which it will be easy to burn the garbage at home, and which will be simple to operate and cheap to construct.

The invention will be readily understood with the aid of the accompanying drawings in which.

Like numerals of reference indicate corresponding parts in each figure.

Figure 1:
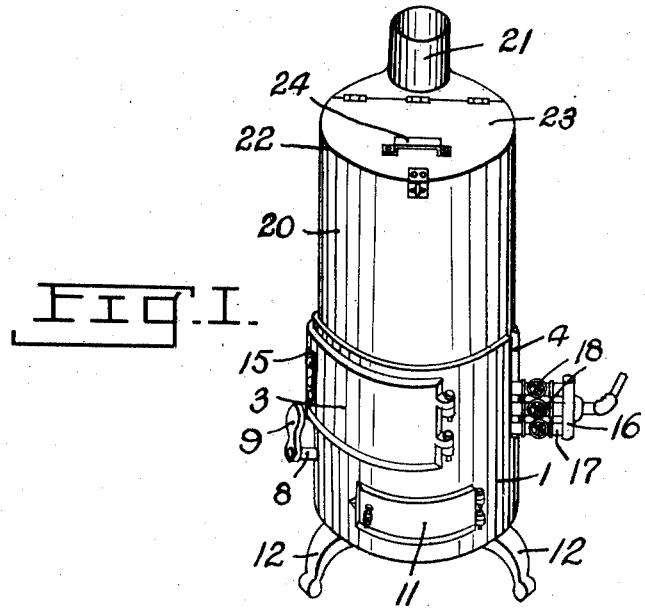
Figure 1 is a perspective view of the invention.

In the drawings 1 represents a cylindrical casing provided with a circumferential opening 2 which is closed by a door 3, and 4 is a vertical opening in the opposite side of said casing. 5 is an inverted frusto-conical plate or hopper suitably secured within said casing 1 and preferably below the openings 2 and 4, said hopper being provided with a cup shaped member 7 for closing its open lower end 6. This cup shaped member 7 is preferably pivotally mounted in the edge wall of said lower end 6, and 8 is a rod rigidly secured thereto and provided at its outer end with a handle 9 for tilting it. An ash pit 10 is provided below said hopper 5 within said casing 1, and has an opening therein which is closed by a door 11.

The said casing 1 is preferably supported above the floor by the legs 12, but it may be here mentioned that any other convenient means of supporting the said casing may be used.

Figure 2:
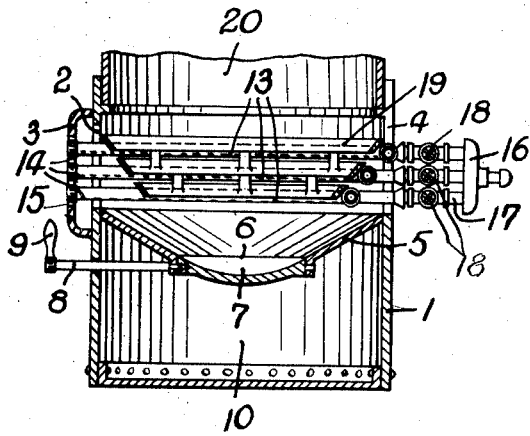
Fig. 2 is a vertical sectional view showing the inner arrangement of the burners and ash tilter.
Figure 3:
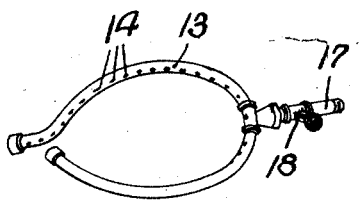
Fig. 3 is a perspective view of one of the burners.

Above the hopper 5 are preferably disposed one above another a plurality of gas burners 13 each of which consists of a looped pipe provided with a plurality of gas holes 14, one end of said pipe being bent in such a manner as to project outwardly through the opening 2 and terminating in an opening 15 provided in the door 3. The loop of each succeeding looped burner pipe 13 is slightly larger than that of the next lower pipe so that a slanting or oblique arrangement is thereby obtained, as will be understood from Fig. 2, each of said pipes being connected to the header 16 by a nipple 17. 18 is a valve provided on each nipple for controlling the gas supply in the corresponding burner.

Each burner is preferably protected by an oblique annular plate 19 which is loosely mounted over said burner.

On the top of said casing 1 is mounted an upwardly projecting casing 20 provided with an outlet 21 for the smoke and other products of combustion, and with a garbage opening 22 which is closed by a hinged cover 23. 24 is a handle for opening said cover.

The gas header 16 is preferably connected to any suitable gas supply and any convenient means of mixing the air and gas before it enters the burner may be employed.

In the operation of this incinerator, the garbage is introduced through the opening 22 and falls into the hopper 5, where it is retained by the cup shaped member 7 and piles above and over the plates 19 in the casing 1. The burners being protected by said plates 19 will not clog or block.

When the incinerator is filled with garbage, each burner is ignited through the opening 15 provided in the door 3.

The products of combustion, as well as odors emanating from the burning matter, will escape through the outlet 21 while the ashes which accumulate in the cup shaped member 7 will be tilted by said member into the ash pit 10 when the handle is swung in either direction.

All of the burners may be ignited at one time or only one or two, according to the amount and quality of garbage to be incinerated.

It will readily be understood from the foregoing description that the shape or arrangement of this incinerator may be modified without departing from the scope of the invention, and that only a preferred form is disclosed in the present application.

What I claim as my invention is:

1. An incinerator comprising a casing containing an incinerating chamber and an ash pit therebeneath; a hopper within the casing between said chamber and pit, adapted to receive and support the material to be incinerated and to discharge the ashes into the pit; a movable closure for the discharge end of the hopper having operating means projecting exteriorly of the casing; a plurality of looped burner pipes arranged one above another in said chamber immediately above said hopper to act directly on the material therein, the loop of each succeeding pipe being slightly larger than that of the next lower pipe; a gas header to which all of the burner pipes are connected exteriorly of the casing; and an obliquely-arranged, annular protector mounted immediately over each of said pipes.

2. An incinerator comprising a casing containing an incinerating chamber and an ash pit therebeneath; a hopper within the casing between said chamber and pit, adapted to receive and support the material to be incinerated and to discharge the ashes into the pit, said hopper embodying a frusto-conical plate having its small end directed downward toward the pit; a movable, cup-shaped closure for said end having operating means projecting exteriorly of the casing; a plurality of looped burner pipes arranged one above another in said chamber immediately above said hopper to act directly on the material therein, the loop of each succeeding pipe being slightly larger than that of the next lower pipe; a gas header to which all of the burner pipes are connected exteriorly of the casing; and an obliquely-arranged, annular protector mounted immediately over each of said pipes.

3. An incinerator comprising a casing having a pair of opposite openings, and a door for closing one of them, said door being provided with an opening; said casing containing an incinerating chamber and an ash pit therebeneath; a hopper within the casing between said chamber and pit, adapted to receive and support the material to be incinerated and to discharge the ashes into the pit; a movable closure for the discharge end of the hopper having operating means projecting exteriorly of the casing; a plurality of looped burner pipes arranged one above another in said chamber immediately above said hopper to act directly on the material therein, each burner pipe having one end of its loop extending through the opening in the casing closed by the door and terminating in an ignition portion which lies in the opening in said door; a nipple connected to the central portion of each loop and extending outwardly through the other opening in the casing; and a gas header to which all of the nipples are attached.

Signed at Montreal, Quebec, Canada, this 12th day of April, 1919.

WILLIAM SAVAGE.

Witnesses:
A. P. DEAL,
A. DES ROSIERS.